United States Patent
Schacher et al.

[15] 3,683,618
[45] Aug. 15, 1972

[54] FRICTION CLUTCH OR BRAKE SYSTEM

[72] Inventors: Willi Schacher; Heinz-Jurgen Beck, both of c/o Patentburo, Zahnradfabrik, 7990 Friedrichshafen, Germany

[22] Filed: Jan. 19, 1971

[21] Appl. No.: 107,623

[30] Foreign Application Priority Data

Feb. 11, 1970   Germany..........P 20 06 019.9

[52] U.S. Cl.....................................60/52 R, 192/85
[51] Int. Cl.............................................F15b 15/18
[58] Field of Search..........60/52 HF, 54.5 HA, 52 R; 192/85

[56] References Cited

UNITED STATES PATENTS

| | | | |
|---|---|---|---|
| 2,538,997 | 1/1951 | Weiland | 192/85 |
| 2,403,912 | 7/1946 | Doll | 60/52 HF |
| 2,413,876 | 1/1947 | Lefler | 60/52 HF |
| 2,448,467 | 8/1948 | Rockwell | 60/52 HF |
| 2,481,991 | 9/1949 | Ernst | 60/52 HF |
| 2,473,694 | 6/1949 | Renick | 60/52 HF |
| 2,499,563 | 3/1950 | Bill | 60/54.5 H |
| 2,539,361 | 1/1951 | Cannon | 60/52 HF |
| 2,706,891 | 4/1955 | Greer | 60/52 HF |
| 3,247,668 | 4/1966 | Van Hecke et al. | 60/52 HF |
| 3,550,375 | 12/1970 | Norton et al. | 60/52 HF |

*Primary Examiner*—Martin P. Schwadron
*Assistant Examiner*—Leslie J. Payne
*Attorney*—Zalkind, Horne & Shuster

[57] ABSTRACT

For rapid operation of friction clutches or brakes, where fluid pressure to effect engagement by actuating a power piston is utilized, the actuating pressure cylinder is maintained substantially filled with pressureless fluid. A small auxiliary piston connected for actuation with a pressure source, and with the power cylinder chamber, is pressure operated in response to manual or other movement of a main control valve to move in a direction to build pressure whereby the power piston is shifted into operative engagement with the plates of a clutch, for example. Subsequent to such initial movement of the power piston, the chamber is directly connected to the pressure source for power piston work actuation. Accordingly, operation is not dependent upon time consuming passage of fluid from a pump to the pressure cylinder in order to fill the chamber, but only to exert working pressure, thereby achieving rapid action of pressure operated devices.

9 Claims, 1 Drawing Figure

Patented Aug. 15, 1972
3,683,618
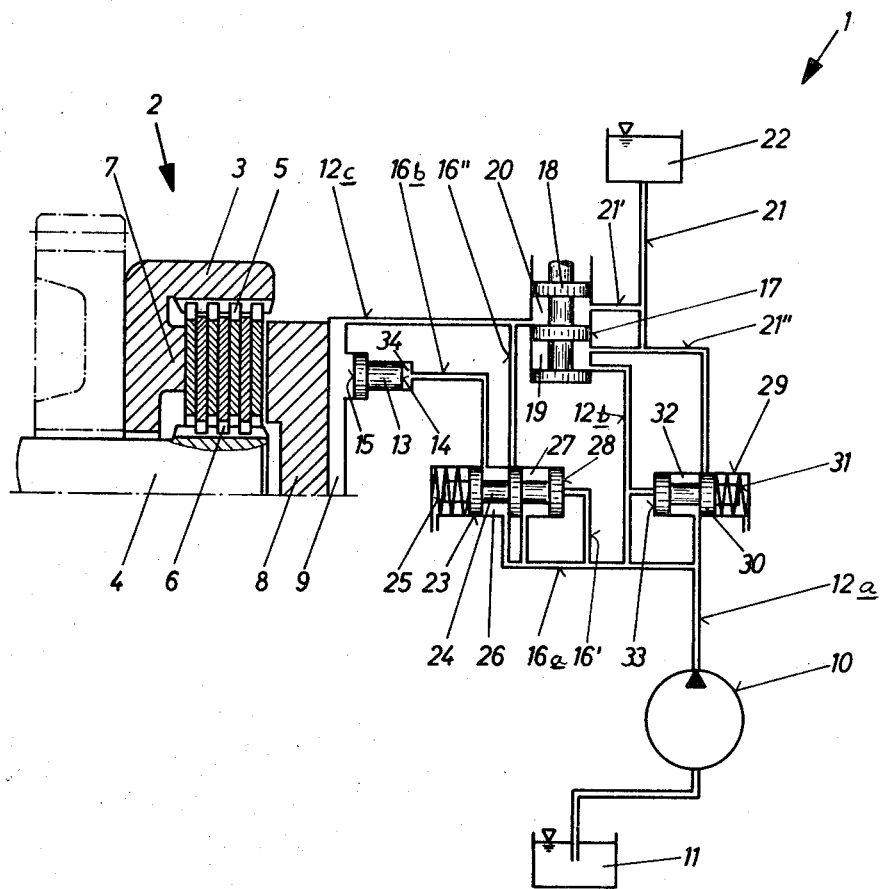
INVENTORS
Willi Schacher
Heinz-Jürgen Beck
ATTORNEY

FRICTION CLUTCH OR BRAKE SYSTEM

In systems which use hydraulic pressure for actuating pressure operated devices there has always been a long delay in time due to the requirement for filling the power pressure chamber of the hydraulic cylinder from a source of pressure fluid, such as a pump, through various control valves and devices. As a result, the advantages found in the simplicity of utilizing conventional disc type clutches and brakes or other pressure operable devices, particularly with wet operating discs, are lost in many applications. The shifting time of such devices is too long to warrant the control complications involved as well as the problem of compensating for leakage losses.

Accordingly, a need existed for a relatively simple, rapidly operating, system of pressurizing devices such as disc clutches and brakes and the present invention fills that need.

The system herein utilizes an auxiliary piston directly communicating with the piston chamber of a power cylinder, such auxiliary piston being relatively small, and the chamber being normally maintained filled with hydraulic pressure fluid which is not drained when it is desired to disengage the clutch or brake but remains in the power cylinder. Such auxiliary piston is briefly pressure operated to effect a small movement sufficient to pressurize the power cylinder so as to bring the power piston therein into full working engagement with a disc pack but without exerting working pressure on the disc pack. After such initial engagement, fluid under pressure is then fed to the power cylinder to exert the working pressure actuating the clutch or brake, as the case may be. The system is under control of a manually operable spool valve, but is otherwise entirely automatic in its functioning.

A detailed description of the invention now follows in conjunction with the appended diagrammatic drawing.

Referring to the drawing, a system 1 is indicated for controlling, for purposes of illustration, a clutch 2. The clutch 2 comprises a clutch housing 3 on a shaft 4 and the usual clutch discs 5 are keyed to the housing with clutch discs 6 being keyed to the shaft, thus forming a disc pack. An abutment ring 7 is provided to take the thrust of the disc pack when compressed by the power piston 8 upon pressurization of the power pressure chamber 9 of what will be understood to be a power cylinder.

Ordinarily, to engage the clutch, the volume of the power chamber 9 must be filled with oil under pressure, a time consuming operation and one which makes a simple clutch of this type impractical for some applications. However, in this invention, chamber 9 is continuously kept filled with fluid, and an auxiliary piston means 13 is provided in a chamber directly connecting with the chamber 9 and having a face 15 exposed in that chamber. With the power piston 8 in the position shown, it is in a disengaged non-working position, and it is assumed that a small gap exists between it and the disc pack. Chamber 9 is maintained substantially filled with pressureless fluid such as oil in a manner to be disclosed.

It will be appreciated that movement of piston 13 to the left will pressurize chamber 9 sufficiently to bring piston 8 into working engagement with the disc pack. This is accomplished without the addition of any oil or fluid to chamber 9. Subsequently, if chamber 9 be pressurized as by pump 10, it will be apparent that working pressure for the clutch is effected since piston 8 will then apply squeezing pressure to the disc pack.

The initial pressurizing of chamber 9 to bring piston 8 into working engagement and subsequent pressurizing by pump 10 is effected automatically and very rapidly responsive to a spool valve 17 which may be a manually controlled valve.

Thus, viewing the system comprising the hydraulic components it will be noted that a reservoir 11 feeds pump 10 having an output line 12a connecting to a pressure relief valve 29 and branch 12b going to a port of spool valve 17. A further line 16a connecting to line 12a goes to two ports of a pressure operated valve 23 and has a branch 16' connected to pressurize the end face 28 of the spool valve 23 for actuation thereof. The spool valve operates toward the left against a bias spring 25. The piston 24 of the spool valve demarcates annular chambers 26 and 27 in the valve housing, as shown.

Another port of pressure operable valve 23 connects via line 16b to the chamber 34 at the smaller end of auxiliary piston 13 for exerting pressure on the face 14 of that piston. Another port of the pressure operable valve connects to the line 16" which communicates with a line 12c that connects to a port of the manually operable valve 17 and also to the pressure chamber 9 of the power cylinder. The intermediate spool section of valve 23 can cover and uncover the ports connecting to line 16a, alternately, while covering or uncovering the port leading to line 16".

The manually operable valve 17 has a rod 18 for actuating and carries the usual spool sections between which are passages or annular chambers 19 and 20, as shown. An additional port of the manually operable valve connects via a line 21' to the line 21 in turn connecting to a reservoir 22 which may feed into the system by gravity and is replenished in a manner to be described. A further port of the manually operable valve connects by a line 21" to the pressure relief valve 29 having spool elements 30 and 33 with a chamber 32 therebetween and acting against spring 31. Line 12b connects to conduct pressure to the outer face of spool section 33 as shown to actuate the spool against spring bias.

In the position of the manually operable valve 17 and the other components of the system as shown, the system is in neutral condition, power piston 8 being disengaged and a circulatory pressureless flow from reservoir 11 through pump 10, line 16a, chamber 26 valve 23 to the smaller end of piston 13 in chamber 34 occurs. Pressureless flow also passes upwardly through the line 12a and via line 12b and line 21 to the reservoir 22. From reservoir 22 flow can take place by gravity via lines 21 and line 21' through valve 17 into line 12c to power chamber 9. Thus the chamber is maintained filled and in the event of any leakage in that chamber or anywhere else in the system, fluid from reservoir 22 will gravitate to compensate. Of course, with the system in neutral condition as shown, there is also mingling of pump fluid with flow from reservoir 22 to any part of the system accessible to gravitational flow.

When it is desired to engage the clutch, the spool of valve 17 is shifted upwardly thereby cutting off flow from line 12b and also cutting off flow to line 12c. This isolates cylinder chamber 9 from pressureless flow. At the same time a pressure is built up in the lines 16a and 16b including the left hand annular channel of valve 23 and chamber 34, forcing piston 13 to the left. Should there happen to be any slight slack volume in chamber it will be immediately taken up, but primarily the effect of this motion of piston 13 is to pressurize chamber 9 causing power piston 8 to close the gap to the disc pack, if there be one, but in any event to effect a working engagement with the disc pack.

The continued build up of pressure after such slight movement of the power piston causes sufficient pressure in line 16' to shift the spool 24 of valve 23 toward the left against spring 25 which cuts off further flow to the auxiliary piston chamber 34 and at the same time opens up communication for fluid under pressure from line 16a through chamber 27, the line 16'' and thence to line 12c leading to power chamber 9. Accordingly, a working engagement of piston 8 is effected all in response and in accordance with timing predetermined by the strength of spring 25.

It will be noted that the face 15 of the auxiliary piston is larger than face 14 and this is advantageous in order to very rapidly effect the initial working engagement of power piston 8 with the disc pack. Of course, it will be understood that a number of piston arrangements such as 13 may be provided in parallel coacting with chamber 9 and fed via a line 16b.

The pressure relief valve 29 is actuated in the event that pressure in line 16a builds up beyond that for which the spring 31 is predetermined. Thus the pressure acts on spool face 33. This shifts the relief valve spool to the right, depending upon the setting of spring 31, to by-pass flow from the pump to the reservoir 22 via line 21''.

Any conventional arrangement of float switches can be provided to maintain any desired predetermined level of the reservoirs 11 and 22.

We claim:

1. In a pressure operating system for clutches or the like, a pressure power chamber (9) having a power piston (8) therein actuatable by pressure in said chamber; a clutch assembly drivingly engageable by actuation of said power piston; means for maintaining said power chamber substantially filled with pressureless fluid; auxiliary piston means (13) connecting with said chamber for effecting an initial pressure in said chamber to ensure an initial engagement of said clutch assembly by actuation of said auxiliary piston means; and pressure source means for subsequently pressurizing said chamber to actuate the power piston to apply driving engagement of said clutch assembly.

2. In a system as set forth in claim 1, said means for maintaining said power chamber filled with pressureless fluid comprising a reservoir (22); said pressure source means comprising an oil pump, manual control valve (17), and a pressure operable valve (23); said power chamber being initially connected to said reservoir through said manual control valve to maintain a pressureless output flow from said pump; and said auxiliary piston means being connected to said pump having initially pressureless flow therefrom through said pressure operable valve; said manual control valve being operative to direct fluid to said power chamber from said reservoir to maintain said pressureless condition or to block flow between said reservoir and said power chamber to permit pressure build up in output flow from said pump; and connection means for said valves, said power chamber, said auxiliary piston means, said reservoir and said pump wherein said blocking of flow by said manual control valve effects building of pressure fluid flow from said pump to actuate said auxiliary piston means to effect said initial pressure in said power chamber, and subsequent continued building of pump output pressure effects operation of said pressure operable valve to direct fluid to said power chamber through said pressure operable valve from said pump.

3. In a system as set forth in claim 2, wherein said connection means comprises connections from said pump to said auxiliary piston means through said pressure operable valve to permit pressureless flow therethrough to said auxiliary piston means or to permit pressure flow therethrough to said auxiliary piston means dependent upon operation of said manual control valve and prior to operation of said pressure operable valve and wherein operation thereof cuts off pressure flow to said auxiliary piston.

4. In a system as set forth in claim 1, said pressure source means comprising a control valve (17) operable at the will of an operator and a source (10) of pressure controlled thereby, for actuating said auxiliary piston means to effect said initial pressure; said pressure means further comprising a pressure operated valve means (23) operatively connected to direct pressure flow to said power chamber upon control valve operation to actuate said power piston to effect driving engagement in response to a predetermined pressure.

5. In a system as set forth in claim 1, said pressure source means comprising a manual control valve (17) and source (10) of pressure controlled thereby, for actuating said auxiliary piston means (13) to effect said initial pressure on said power piston (8);

said pressure source means further comprising a pressure operated valve means (23) operatively connected to direct pressure flow to said power chamber (9) to actuate said power piston to effect clutch engagement in response to a predetermined pressure; including means (10, 17, 22, 23) for maintaining said power chamber filled with pressureless fluid and comprising a reservoir for pressureless fluid;

including connection means whereby said manual control valve is selectively operative for feeding pressureless fluid to said reservoir and to said power chamber from said reservoir; or, alternatively, to block connection between said reservoir and said power chamber whereby fluid under pressure feeds (16') to said pressure operated valve from said pressure source to actuate said latter valve to direct pressure flow to said power chamber through said latter valve from said pressure source.

6. In a system as set forth in claim 1, said auxiliary piston means comprising a double ended piston having an end area exposed to said power chamber and another end area operative to receive fluid pressure for actuation, said former end area being larger than said latter end area.

7. In a system as set forth in claim 1, including means for maintaining said power chamber filled with pressureless fluid and comprising a reservoir (22); said pressure source means comprising valve control means and connection means operative for feeding pressureless fluid to said reservoir and to said power chamber from said reservoir;

or, alternatively, to block connection between said reservoir and said power chamber while fluid under pressure is fed to said power chamber.

8. In a system as set forth in claim 1, said auxiliary piston means comprising an auxiliary piston chamber and an auxiliary piston therein; said chamber having an open end terminating at said pressure chamber for direct connection therewith.

9. In a system as set forth in claim 1, said auxiliary piston means comprising an auxiliary piston chamber and an auxiliary piston therein; said chamber having an open end terminating at said pressure chamber for direct connection therewith;

said auxiliary piston comprising a double ended piston having an end area exposed to said power chamber and another end area operative to receive fluid pressure in said auxiliary piston chamber for actuation of said auxiliary piston, said former end area being larger than said latter end area.

* * * * *